Sept. 20, 1966 D. R. GRAHL 3,273,797
AIR CONDITIONER VALVE
Filed Feb. 19, 1965
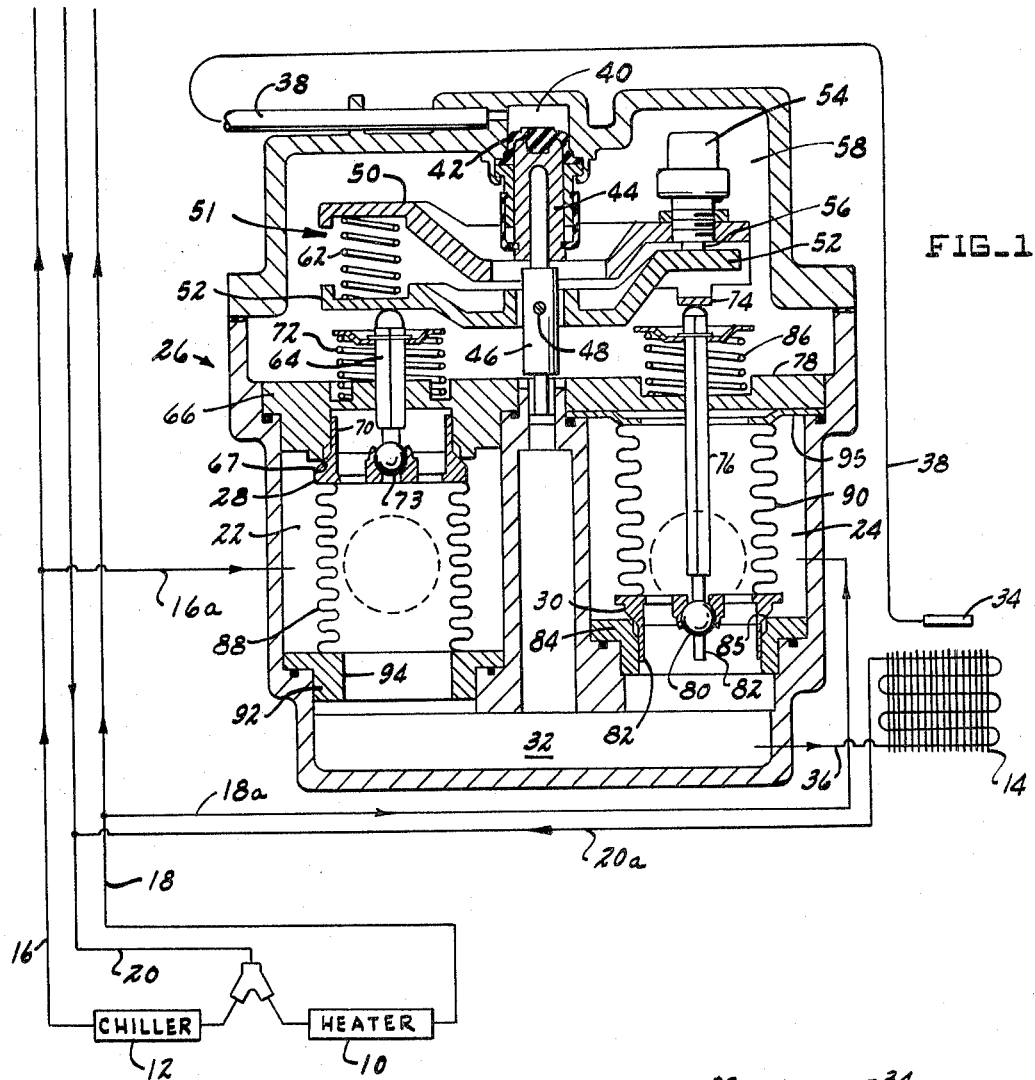
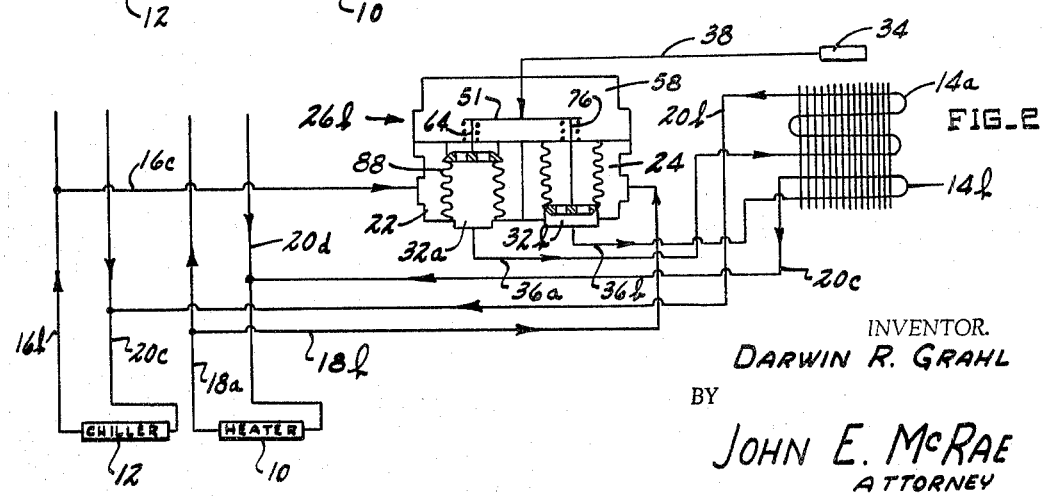
INVENTOR.
DARWIN R. GRAHL
BY
JOHN E. McRAE
ATTORNEY 3,273,797
AIR CONDITIONER VALVE
Darwin R. Grahl, Lincoln Park, Mich., assignor to American Radiator & Standard Sanitary Corporation, New York, N.Y., a corporation of Delaware
Filed Feb. 19, 1965, Ser. No. 433,900
6 Claims. (Cl. 236—1)

This invention relates to valves, particularly thermostatically-controlled valves for regulating the flow of hot and cold water streams through heat exchangers in room air conditioning systems.

One object of the invention is to provide a water valve capable of handling and controlling relatively large flows.

Another object is to provide a water valve which can be operated by the relatively small operating forces obtainable from conventional fluid-charged thermostatic bulbs.

Other objects of the invention will appear from the following description and appended claims, reference being had to the accompanying drawings forming a part of this specification wherein like reference characters designate corresponding parts in the several views.

In the drawings:

FIGURE 1 is a diagrammatic view of a three pipe air conditioning system having a valve of the present invention employed therein;

FIG. 2 is a schematic diagram of a four pipe air conditioning system employing a valve of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In FIG. 1 of the drawings therein shown an air conditioning system comprising a central water heater or boiler 10 and a central water cooler or chiller 12 for supplying hot and cold fluids to a room heat exchange coil 14. In practice additional room heat exchange coils (not shown) are supplied with fluid from the central heater and cooler through branch lines connected with main lines 16, 18 and 20. The illustrated system is a three-pipe system having a main cold water supply line 16, a main hot water supply line 18, and a main common return line 20. Branch lines 16a, 18a and 20a connect the main lines with the illustrated room conditioner coil 14.

It will be noted that branch lines 16a and 18a communicate with hot and cold inlet chambers 22 and 24 of a multi-piece valve body 26. The valve body is subdivided into an upper operator chamber 58, the two centrally located inlet chambers 22 and 24, and a lower outlet chamber means 32. In the FIG. 1 valve chamber means 32 consists of a single chamber communicating with the two inlet chambers, while in the FIG. 2 valve the outlet chamber means consists of two separate outlet chambers, each communicating with a separate one of the inlet chambers.

Disposed within the FIG. 1 valve body are two separate valve elements 28 and 30 arranged to meter the hot and cold flows into the outlet chamber 32 in accordance with variations in the air temperature sensed by thermostatic bulb 34. Increasing bulb temperatures cause the lever mechanism 51 in chamber 58 to close hot valve element 30 and to open cold valve element 28, thereby permitting only cold water to pass into chamber 32 and through line 36 to the heat exchange coil. Decreasing bulb temperatures cause lever mechanism 51 to close cold element 28 and to open hot element 30, thereby permitting only hot water to pass through chamber 32 to the coil. In practice the valve body is equipped with suitable threaded connections (not shown) for operatively connecting chambers 32, 22 and 24 into the water system. Preferably the connections for chambers 22 and 24 have strainers therein, and the connection for chamber 32 has a check valve therein for preventing back flow of water from lines 20 and 20a.

As shown schematically in FIG. 1, bulb 34 connects with capillary tubing 38 which communicates with a pressure chamber 40 closed by diaphragm 42. Cooperating with diaphragm 42 is a piston 44 which encircles the upper end portion of a reciprocable stem 46. The central portion of the stem carries a transverse pivot pin 48 which extends through overlapping flange portions of two independently movable levers 50 and 52. The levers together form the aforementioned lever mechanism 51.

As illustrated in the drawing, the right end portion of lever 52 carries a solid-fill thermostatic power element 54 of the type more particularly described in U.S. Patent 2,636,776. The piston 56 of the element engages the upper surface of lever 52 whereby temperature increase in chamber 58 causes element 54 to urge the right end portions of levers 50 and 52 apart. As the right end portions of levers 50 and 52 move apart the like end portions thereof move closer together in a scissors-like motion about the axis of pivot pin 48. A compression spring 62 provides a suitable biasing force for moving the left end portions of levers 50 and 52 apart when element 54 contracts, as on temperature decrease in chamber 58.

The left end portion of lever 52 engages a square cross section stem 64 which passes through a circular opening in wall 66 and which has a lower spherical end portion 73 universally connected with cold valve element 28. Further, the underface of the fixed seat-forming wall 66 is cylindrically recessed to form a guide surface for four circumferentially spaced struts 70 on the valve element, whereby the element enjoys rectilinear motion toward and away from the valve seat even though stem 64 enjoys but limited guiding engagement with wall 66. Stem 64 and valve element 28 are normally urged upwardly to the illustrated position by a relatively heavy compression coil spring 72.

The right end area of lever 50 is provided with a wall portion 74 which engages a square cross section stem 76 passing freely through a circular opening in fixed partition 78. As with stem 64, stem 76 is provided with a spherical portion 80 which has a universal connection with hot valve element 30. Four guide struts 82 may be provided on the valve element to restrict the element to rectilinear movement toward and away from valve seat wall 84. Relatively weak compression spring 86 normally urges stem 76 and valve element 30 upwardly from their illustrated positions. Spring 72 is heavier than spring 86 so that valve element 28 is normally urged upwardly to the illustrated closed position.

A major feature of the present invention relates to an improved means for mounting each valve element 28 and 30 in a desired operating mode. As shown in the drawing, valve element 28 is mounted on and sealed to the upper end of a pressure-balancing bellows 88; valve element 30 is mounted on and sealed to the lower end of a pressure-balancing bellows 90. The lower end of bellows 88 is sealed to fixed portion 92 of the valve body, and the upper end bellows 90 is sealed to a fixed portion 95 of the valve body. The interior surface of each bellows communicates with outlet chamber 32, and the exterior surface of each bellows communicates with the respective inlet chamber 22 or 24.

It will be noted that the effective area of bellows 88 is substantially the same as the area encompassed by seat 67, and the effective area of bellows 90 is substantially the same as the area encompassed by seat 85. The area relationships are important in that they materially reduce any unbalanced pressure forces on the upstream and downstream sides of each valve element, and thus lessen the force required to open or close each valve.

In its illustrated position valve 26 is completely closed to fluid flow. Assuming now a drop in the air temperature surrounding bulb 34, there will be a contraction of the bulb fluid and a corresponding decrease in the chamber 40 pressure. As a result, spring 86 will be effective to pivot lever mechanism 51 about its point of engagement with stem 64, thereby opening valve element 30 and permitting hot water to flow through chamber 32 to the heat exchange coil 14. In the event of a continued drop in bulb 34 temperature there is a continued opening movement of valve element 30 whereby to cause the element to deliver a metered flow of hot water proportioned to the demand for heating sensed by bulb 34.

As the heating demand sensed by bulb 34 lessens the chamber 40 pressure increases, whereby piston 44 drives lever mechanism 51 downwardly about its point of engagement with stem 64, thereby causing stem 76 to close valve element 30 against its seat 85.

If the temperature of bulb 34 should rise above a predetermined value the chamber 40 pressure will increase sufficiently so that lever mechanism 51 rocks downwardly about its point of engagement with stem 76, thereby causing stem 64 to open valve element 28 against the biasing force of spring 72; during this period element 30 engages seat 85 to support stem 76 against movement. As element 28 opens cold water flows from chamber 22 into the interior of bellows 88, through chamber 32, and into coil 14. As the cooling demand sensed by bulb 34 lessens the chamber 40 pressure is reduced to permit spring 72 to move element 28 to the closed position.

The control temperature for bulb 34 may be adjusted in a conventional manner, as by connecting a variable volume housing to chamber 40 and providing a manual means for adjusting the housing volume. Manual adjustment of the housing volume can then be used to vary the chamber 40 pressure for any given bulb 34 temperature, to thus vary the control temperatures which are effective to open and close valves 28 and 30.

During the periods when valve element 28 is opening some of the cold water passes upwardly around non-circular stem 64 into chamber 58 to thereby cool the thermostatic power element 54. The power element thus contracts and causes the left end portions of levers 50 and 52 to spread apart, thereby increasing the rate of opening of element 28. During the periods when element 30 is opening some of the hot water passes upwardly around stem 76 into chamber 58 to cause power element 54 to expand, thereby moving the right end portions of levers 50 and 52 apart, thus increasing the rate of opening of element 30. Heating and cooling of the fluid in chamber 40 and capillary 38 is also compensated for by the lever arrangement. The multiple levers 50 and 52 thus cooperate with power element 54 to reduce the hysterisis which would otherwise occur between the heating and cooling cycles. If a less sensitive system is desired a single lever can be employed in lieu of the multiple levers 51 and 52.

A major feature of the present invention resides from the fact that bellows 88 and 90 have substantially the same effective areas as their respective valve seats. Because of this arrangement the forces needed to open particular sized valve elements are considerably reduced. Stated another way, with a given conventional thermostatic bulb 34 the illustrated use of the pressure-balancing bellows 88 and 90 permits the valve elements and valve seats to be relatively large, much larger than would be possible without using the pressure-balancing bellows. For example, when a conventional thermostatic bulb 34 is used with a conventional valve (not having the balancing bellows) the valve handles about four gallons per minute. In contrast, when the same bulb is used with the illustrated valve design the valve seats can be enlarged to handle flows of approximately ten gallons per minute.

The valve shown in FIG. 1 employs the balancing bellows with their interior surfaces exposed to the outlet chamber and with their exterior surfaces exposed to the respective inlet chambers. However, it is contemplated that with suitable relocation of the valve inlet fittings and outlet fittings either or both of the balancing bellows can have their interior surfaces exposed to the inlets and their exterior surfaces exposed to the outlet.

FIG. 2 shows the invention as applied to a valve used in a four pipe air conditioning system. In this type of system the hot water and cold water are circulated through separate circuits. Each room heat exchanger includes separate hot and cold water coils, and there are separate return lines for the spent hot and cold liquid streams, all as more particularly shown and described in my copending U.S. patent application, Serial No. 399,509 filed September 28, 1964.

In the system shown in FIG. 2 the cold water is circulated through a circuit which includes chiller 12, main supply line 16b, branch line 16c, valve chamber 22, the interior of bellows 88, outlet chamber 32a, line 36a, heat exchange coil 14a, return branch line 20b, and main return line 20c. The hot water is circulated through a circuit which includes heater 10, main supply line 18a, branch line 18b, valve chamber 24, outlet chamber 32b, line 36b, heat exchange coil 14b, return branch line 20c, and main return line 20d.

Valve 26b in FIG. 2 may be generally similar to valve 26 in FIG. 1 except for the fact that two separate outlet chambers 32a and 32b are used in place of the single outlet chamber 32. Further, in the FIG. 2 valve a seal is preferably provided around stem 64 or 76 to prevent intermingling of the cold and hot streams through chamber 58.

As before noted, the primary feature of this invention is the utilization of the balancing bellows for the high capacity hot and cold water valves to enable them to be controlled by single relatively low force thermostatic power means (comprised of members 34, 40 and 51).

What is claimed:

1. In combination: a valve body defining a cold fluid inlet chamber, a hot fluid inlet chamber, and outlet chamber means; a first valve seat located between the cold inlet chamber and the outlet chamber means; a second valve seat located between the hot inlet chamber and the outlet chamber means; a first valve element movable toward and away from the first valve seat to control flow therepast; a second valve element movable toward and away from the second valve seat to control flow therepast; means mounting said first valve element comprising a first pressure-balancing bellows having one of its ends sealed to the valve body and having its other end sealed to the valve element; said bellows having its interior surface exposed to one of the cold inlet chamber and outlet chamber means, and its exterior surface exposed to the other of said cold inlet chamber and outlet chamber means; means mounting said second valve element comprising a second pressure-balancing bellows having one of its ends sealed to the valve body and having its other end sealed to the second valve element; said second bellows having its interior surface exposed to one of the hot inlet chamber and outlet chamber means, and its exterior surface exposed to the other of said hot inlet chamber and outlet chamber means; the first bellows having substantially the same effective area as the first valve seat, and the second bellows having substantially the same effective area as the second valve seat.

2. The combination of claim 1 and further comprising a single temperature-responsive power means arranged to operate both valve elements between their open and closed positions.

3. The combination of claim 1 and further comprising a lever means located externally of the hot and cold chambers; a first stem extending between the first valve element and one end of the lever means; a second stem extending between the second valve element and the other end of the lever means; thermostatic power means engaging an intermediate area of the lever means; and spring means urging the first valve element against the first valve seat; whereby temperature increase of the power means causes the lever means to close the second valve element and to thereafter open the first valve element against the bias of the spring means, and temperature decrease of the power means causes the spring means to close the first valve element and to thereafter permit the lever means to open the second valve element.

4. In combination: a valve body defining a hot fluid inlet chamber, a cold fluid inlet chamber, an outlet chamber means, a cold valve seat located between the cold fluid chamber and the outlet chamber means; a hot valve seat located between the hot inlet chamber and the outlet chamber means; a first valve element movable toward and away from the cold valve seat to control flow therepast; a second valve element movable toward and away from the hot valve seat to control flow therepast; means mounting the cold valve element comprising a first pressure balancing bellows disposed in the cold inlet chamber with one of its ends sealed to a surface of the valve body, and with its other end sealed to the cold valve element; means forming a passage between the bellows interior and the outlet chamber means, whereby the exterior surface of the bellows is exposed to the cold inlet chamber and the interior surface of the bellows is exposed to the outlet chamber means; means mounting the hot valve element comprising a second pressure-balancing bellows located within the hot inlet chamber with one of its ends sealed to a surface of the valve body, and with its other end sealed to the hot valve element, whereby the exterior surface of said second bellows is exposed to the hot inlet chamber and the interior surface of said second bellows is exposed to the outlet chamber means; said first bellows having substantially the same effective area as the cold valve seat, and the second bellows having substantially the same effective area as the hot valve seat.

5. In combination: a valve body defining a hot fluid inlet chamber and cold fluid inlet chamber located centrally within the body, an outlet chamber means located at one end of the body, and an operator chamber located at the other end of the body; a first valve seat located adjacent the end of the cold fluid chamber nearest the operator chamber; a hot valve seat located in the end of the hot inlet chamber nearest the outlet chamber means; a first valve element movable toward and away from the cold valve seat to control flow therepast; a second valve element movable toward and away from the hot valve seat to control flow therepast; means mounting the cold valve element comprising a first pressure-balancing bellows disposed in the cold inlet chamber with one of its ends sealed to a surface of the valve body located adjacent the outlet chamber means, and with its other end sealed to the cold valve element; means forming a passage between the bellows interior and the outlet chamber means, whereby the exterior surface of the bellows is exposed to the cold inlet chamber and the interior surface of the bellows is exposed to the outlet chamber means; means mounting the hot valve element comprising a second pressure-balancing bellows disposed in the hot inlet chamber with one of its ends sealed to a surface of the valve body located adjacent the operator chamber, and with its other end sealed to the hot valve element, whereby the exterior surface of said second bellows is exposed to the hot inlet chamber and the interior surface of said second bellows is exposed to the outlet chamber means; said first bellows having substantially the same effective area as the cold valve seat, and said second bellows having substantially the same effective area as the hot valve seat.

6. In combination: a valve body defining a hot fluid inlet chamber and cold fluid inlet chamber located centrally within the body, an outlet chamber means located at one end of the body, and an operator chamber located at the other end of the body; a first valve seat located adjacent the end of the cold fluid chamber nearest the operator chamber; a hot valve seat located in the end of the hot inlet chamber nearest the outlet chamber means; a first valve element movable toward and away from the cold valve seat to control flow therepast; a second valve element movable toward and away from the hot valve seat to control flow therepast; means mounting the cold valve element comprising a first pressure-balancing bellows disposed in the cold inlet chamber with one of its ends sealed to a surface of the valve body located adjacent the outlet chamber means, and with its other end sealed to the cold valve element; means forming a passage between the bellows interior and the outlet chamber means, whereby the exterior surface of the bellows is exposed to the cold inlet chamber and the interior surface of the bellows is exposed to the outlet chamber means; means mounting the hot valve element comprising a second pressure-balancing bellows disposed in the hot inlet chamber with one of its ends sealed to a surface of the valve body located adjacent the operator chamber, and with its other end sealed to the hot valve element, whereby the exterior surface of said second bellows is exposed to the hot inlet chamber and the interior surface of said second bellows is exposed to the outlet chamber means; said first bellows having substantially the same effective area as the cold valve seat, and said second bellows having substantially the same effective area as the hot valve seat; means for moving the two valve elements comprising a first stem connected with the first valve element and extending into the operator chamber, a second stem connected with the second valve element and extending into the operator chamber, lever means disposed in the operator chamber with one of its ends engaging the first stem and with its other end engaging the second stem, temperature-responsive power means engaging an intermediate portion of the lever means, and spring means biasing the cold valve element against the cold seat, whereby temperature increase of the power means is effective to pivot the lever means on the first stem until the hot valve element is closed and to them pivot the lever means on the second stem to open the cold valve element, and temperature decrease of the power means is effective to permit the spring means to bias the cold valve element closed, after which the lever means pivots on the first stem to open the hot valve element.

References Cited by the Examiner
UNITED STATES PATENTS 3,182,909   5/1965   Noakes et al. _____ 236—1
3,189,275   6/1965   Sorensen et al. _____ 236—1

EDWARD J. MICHAEL, *Primary Examiner.*